United States Patent
Marchand

(10) Patent No.: US 11,450,048 B2
(45) Date of Patent: Sep. 20, 2022

(54) AUGMENTED REALITY SPATIAL GUIDANCE AND PROCEDURE CONTROL SYSTEM

(71) Applicant: Stacey Leighton Marchand, Merrimack, NH (US)

(72) Inventor: Stacey Leighton Marchand, Merrimack, NH (US)

( * ) Notice: Subject to any disclaimer, the term of this patent is extended or adjusted under 35 U.S.C. 154(b) by 0 days.

(21) Appl. No.: 17/073,321

(22) Filed: Oct. 17, 2020

(65) Prior Publication Data

US 2021/0158587 A1 May 27, 2021

Related U.S. Application Data

(63) Continuation of application No. PCT/US2019/027813, filed on Apr. 17, 2019.

(60) Provisional application No. 62/658,917, filed on Apr. 17, 2018.

(51) Int. Cl.
| | |
|---|---|
| *G06T 11/60* | (2006.01) |
| *G06T 7/73* | (2017.01) |
| *G06F 3/01* | (2006.01) |
| *G06T 7/00* | (2017.01) |

(52) U.S. Cl.
CPC .............. *G06T 11/60* (2013.01); *G06F 3/011* (2013.01); *G06T 7/0004* (2013.01); *G06T 7/73* (2017.01); *G06T 2207/30164* (2013.01)

(58) Field of Classification Search
CPC ......... G06T 19/006; G06T 2207/30164; G06T 11/60; G06T 7/0004; G06T 7/73; G06F 3/011
See application file for complete search history.

(56) References Cited

U.S. PATENT DOCUMENTS

| | | | | |
|---|---|---|---|---|
| 2009/0015410 A1* | 1/2009 | Puzio | ................. | G08B 21/0227 340/572.1 |
| 2011/0187746 A1* | 8/2011 | Suto | ........................ | G09G 5/00 345/634 |
| 2014/0090948 A1* | 4/2014 | Krishnarao | ........ | B23Q 11/0092 192/130 |
| 2016/0314623 A1* | 10/2016 | Coleman | ................. | G06F 3/011 |

(Continued)

*Primary Examiner* — Phi Hoang
(74) *Attorney, Agent, or Firm* — Louis J. Franco; Law Office of Louis J. Franco

(57) ABSTRACT

A human system operator is guided through procedures relative to workpiece objects in real space by a machine-executable procedure program including procedure instructions related to the real-space operations. A spatial-positioning system tracks the locations and orientations within a defined physical space of workpiece objects and tools required to perform procedure steps relative to the workpiece objects. Machine-generated indicia related to sequential procedure steps are presented to the system operator through a mixed-reality headset. The machine generated indicia illustratively include graphical objects and textual instructions that convey to the system user information relative to a procedure step, such as which tool to use to act on which workpiece object, and the operation to be performed on each workpiece object. The system operator contemporaneously views both (i) the physical space and (ii) selected machine-generated indicia such that the machine-generated indicia, from the perspective of the system user, are superimposed over real space.

4 Claims, 4 Drawing Sheets

(56) References Cited

U.S. PATENT DOCUMENTS

2016/0375524 A1* 12/2016 Hsu ................. B23K 31/02
                                                       228/8
2018/0262127 A1*  9/2018 Gooneratne ........... E21B 47/00
2019/0362556 A1* 11/2019 Ben-Dor ............ G06K 7/10396

* cited by examiner

AUGMENTED REALITY SPATIAL GUIDANCE AND PROCEDURE CONTROL SYSTEM

CROSS-REFERENCE TO RELATED APPLICATION/PRIORITY CLAIMS

The present application is a continuation of International Application Serial No. PCT/US2019/027813 filed Apr. 17, 2019 pursuant to the Patent Cooperation Treaty, and under the title "AUGMENTED REALITY SPATIAL GUIDANCE AND PROCEDURE CONTROL SYSTEM." Application PCT/US2019/027813 claimed priority benefits in U.S. Provisional Application No. 62/658,917 filed Apr. 17, 2018 under the title "AUGMENTED REALITY INDUSTRIAL ASSEMBLY GUIDANCE AND PROCEDURE CONTROL SYSTEM."

The present application claims the benefit of the filing date of Provisional Application Ser. No. 62/658,917, as well as the filing date of PCT Application No. PCT/US2019/027813, based on the priority chain outlined above. Moreover, the entireties of the disclosures, including the drawings, of both previous applications in the aforesaid priority chain are incorporated herein by reference as if set forth fully in the present application.

BACKGROUND

Illustratively, complex human-implemented assembly procedures are difficult to guide an operator through. For context, the settings for such assembly procedures may include vehicle assembly plants; machine and large appliance fabrication facilities; and repair and rebuild facilities. Assembly procedures can be especially confusing and difficult when the parts being assembled are numerous or large and sophisticated in design. Currently, guidance is provided most commonly in two-dimensional space on paper and computer monitors. In the context of such guidance, an assembler is required to examine two-dimensional representations of workpieces, fasteners, and physical space itself and conceptually transpose those two-dimensional (2-D) representations into the three-dimensional (3-D) space in which the assembler is actually working.

Assembly workers performing complex procedures are prone to error due to guidance systems typically not being three-dimensional in nature. There exist some systems that utilize lasers for guidance, but these are not safe for human vision. Moreover, they are of limited utility in crowded or obstructed settings due to requirements for clean, unobstructed lines of sight through which laser beams can propagate to selected targets. Still further, present 3-D procedure guidance systems do not integrate with external tools and tie reported results together with the process. Finally, the limited universe of 3-D guidance systems on the market today does not enable verification that an assembly worker is actually performing an action on a specific component, and that the action has been completed according to specifications.

Accordingly, a need exists for a method and associated apparatus whereby a person performing a complex, multi-step procedure on physical components in real space is guided through that procedure by step-appropriate indicators processed in machine-based virtual reality, and then presented to the operator as virtual visual indicia appearing to the operator to be superimposed on physical objects in real space through a virtual-reality or mixed-reality headset.

SUMMARY

Various implementations of the present invention relate to the performance of procedures in industrial settings such as the fabrication, assembly, or repair of manufactured goods. Common to several alternative implementations is the general goal of providing to a worker or trainee in such a setting computer-guided assistance through the execution of a predetermined procedure using an augmented reality spatial guidance and procedure control system. More specific goals illustratively include one or more of (i) training newer workers in a particular procedure, (ii) increasing the efficiency of experienced workers, (iii) reducing procedural errors by providing step-by-step procedure guidance, and (iv) tracking for purposes of worker and/or third party confirmation that all steps associated with the procedure are/were performed in each iteration of the procedure in accordance with procedure protocol.

For purposes of describing illustrative implementations of the invention, a person being guided by the system through a predetermined procedure may be referred to alternatively as the "system user," "user," "operator," or "system operator." Moreover, since the person performing the procedure in physical space is assumed to be a "user" or "operator" of a system implementing a variant of the invention, the procedure that the system user is executing may be alternatively referred to as a "user-executed procedure," "user-implemented procedure," "operator-executed procedure," or "operator-implemented procedure," all of which are regarded as interchangeable equivalents.

A user-implemented procedure including at least a first procedure step is illustratively executed by a system user within a predefined physical space, and in conjunction with an augmented reality spatial guidance and procedure control system and method. Implementations of the method invariably include access to a provided programmable data-processing system including a computer memory. The data-processing system is provided with a machine-executable procedure program including procedure instructions indicative of at least the first procedure step, but more typically indicative of a plurality of steps including the first and subsequent procedure steps. Although not so limited in utility and scope, the user-implemented procedure illustratively includes the system user's manipulation of, and operation on, physical objects ("workpieces" or "workpiece objects") in "real" or "physical" space, such as parts to be assembled in an industrial setting. Moreover, the operations are illustratively performed with tangible tools such as, by way of non-limiting example, fastener drivers, riveters, cutters, drills, clamps, and welding devices.

In alternative implementations, or within any single implementation, the tools may be manual hand tools and/or power hand tools. Moreover, in some versions, the power tools used are so-called "smart tools," capable of, for example, communicating with the data-processing system and being controlled in one or more ways by the procedure program. For instance, if a procedure step calls for tightening a nut or bolt by applying predetermined minimum or maximum torque, the procedure program may "talk to" a "smart wrench" to ensure at least the minimum torque is applied and/or that a maximum specified torque is not exceeded. Moreover, as a way of addressing other concerns, such as safety or error reduction, predetermined smart tools may be selectively activatable and deactivatable such that they do not become "active" until they are brought within a predefined proximity of a particular workpiece object to be acted upon in accordance with a current procedure step. Smart tools may be capable of not only receiving commands from the data-processing system, but reporting back to the data-processing system predetermined results of interest such as confirmation that a particular fastener in a specific location on a workpiece was tightened in accordance with the specifications required by the procedure program. These results can then be stored in computer memory for each procedure step within a particular iteration of the overall procedure, and over multiple iterations of the overall procedure.

In at least one implementation, a headset configured for wearing by the system user is provided. The headset of at least one version is a mixed-reality headset that allows the system operator to view simultaneously both (i) the physical space in which the system operator is situated and (ii) selected machine-generated indicia associated with at least the first procedure step. Illustratively, the headset includes a translucent (i.e., at least partially transparent) visor through which the system operator can view the predefined physical space in which the system operator is situated. Carried by the headset is a display through which there can be selectively presented within the field of view of the system user selected machine-generated indicia associated with at least the first procedure step. Again, however, typical implementations will involve the displayed presentation to the system machine-generated indicia associated with multiple procedure steps relative to any one user-implemented procedure.

Through use of the headset associated with various implementations, the user visually experiences "real space" that (s)he would experience without the headset in combination with "virtual reality" in which indicators (machine-generated indicia) appear superimposed over the "real space." The superposition of virtual reality over real space "augments" the sensory experience for the system operator. Accordingly, the headset may be referred to as an "augmented-reality headset." The nature of the experience is also the origin of the characterization of various implementations of the present invention as an "augmented reality spatial guidance and procedure control system." The experience is a "mixed reality," a blend of the physical space and a digital space.

In alternative versions, the visor serves as the display from which machine-generated indicia are presented to the user. In some such versions, the presented indicia are projected to the system user's eye(s) from within the visor itself. In alternative versions, the presented indicia are projected onto the visor from another source carried by the headset. Additional displays, such as monitors or screens within or visible from the physical space may also be employed, and these would be viewed as objects in real space.

In a more conceptually concrete example, non-limitingly illustrative of the indicia that may be presented to the system user are: (i) an illuminated shape highlighting a physical tool to be used in a current procedure step, (ii) an illuminated shape highlighting a component of the workpiece to be acted upon by the user in accordance with a current procedure step, and (iii) an indicium that communicates to the system user information as to the operation to be performed. A specific example of an indicium relative to an operation to be performed is an illuminated arcuate arrow that surrounds and spins about a nut or bolt head in a direction in which that nut or bolt is to be rotated. In some versions, the indicia may appear as "floating" three-dimensional holograms. However, illustrative indicia may also present in other forms such as text, video, photographs, and animations. For instance, as a system user readies to perform a procedure step, text might virtually "pop up" adjacent a fastener stating "tighten this nut," or adjacent a tool stating "use this wrench." Short videos demonstrative of an assembly action might be caused to pop up adjacent parts of a workpiece relative to a present or subsequent procedure step. Audio cues are also among the myriad forms of indicia that may be communicated to the user. Broadly, the idea is that the communicated indicia be "human-perceptible indicia."

In accordance with at least one implementation, there are provided first and second spatial-positioning subsystems, each of which is communicatively linked to the data-processing system. The first spatial-positioning subsystem is configured to generate machine-readable data indicative of at least one of the location and orientation (i.e., pitch, yaw, and roll) of a system operator wearing the headset within the physical space, and communicate this machine-readable data to the data-processing system. The second spatial-positioning subsystem is configured to generate, and communicate to the data-processing system, machine-readable data indicative of at least one of the location and orientation within the physical space of at least one of (i) a workpiece object on which a procedure step is to be performed by the system operator and (ii) a tool with which that procedure step is to be performed by the system operator. In association with either or both of the first and second spatial-positioning subsystems, algorithmic triangulation may be employed with the aid of sensors, transducers, transmitters, and receivers that transmit and/or receive electromagnetic energy including, by way of example, radio frequencies and/or light, such as infrared.

In implementations in which first and second spatial-positioning subsystems are employed, there is provided to the data-processing system a machine-executable co-alignment program. The co-alignment program is configured to algorithmically coordinate the machine-readable data generated by the first and second spatial-positioning subsystems. In this way, relative to selected points in physical space, machine-readable data indicative of location and orientation generated by the first and second spatial-positioning subsystems are caused to be brought into mutual agreement (co-aligned). In some implementations, a single spatial-positioning system may be employed to generate, and communicate to the data-processing system, machine-readable data indicative of (i) at least one of the location and orientation of a system operator and (ii) at least one of the location and orientation of at least one of (a) a workpiece object on which the operation is to be performed as part of a procedure step and (b) the location of the tool to be used in performing the operation.

In order to facilitate use of the system in conjunction with a predefined user-implemented procedure, there is initiated the machine-executable procedure program corresponding to the user-implemented procedure to be performed on a predetermined workpiece object situated within the physical space. The procedure may also involve the use of one or more predetermined tools situated within the physical space. The physical space will typically be predefined and include boundaries within which a system user performs his or her tasks pursuant to execution of the procedure. Such a physical space is sometimes referred to as a "work cell," and can be a room or a subsection of a larger space such as factory floor.

At least when distinct first and second spatial-positioning subsystems as generally described above are used, these subsystems will need to be brought into initial agreement. That is to say, there needs to be an initial calibration to ensure agreement between the coordinate systems of the spatial-positioning subsystems as to locations of selected points within the physical space (e.g., the work cell). For example, the first-spatial positioning subsystem associated with the headset may use what is known as "inside-out" positioning in which the headset determines its position and orientation relative to fixed objects within the physical space. Virtual-reality and mixed-reality headsets employ various on-board sensors such as, but way of example, an inertial measurement unit (IMU), which may include an accelerometer, gyroscope, and a magnetometer; "environment understanding" sensors; one or more cameras; and one or more light-sensors. On the other hand, the second spatial-positioning subsystem may use what is known as "outside-in" positioning in which, for example, one or more "base stations" emits signals into the physical space which are received by "pose trackers" on or in physical proximity with selected objects of interest, such as the aforesaid workpiece object(s) on which a procedure step is to be performed and at least one tool to be used in performing the procedure step. When a "pose tracker" associated with one on these objects receives a signal from a base station, it sends a response to the base station from which location and orientation of the associated object of interest within the physical space can be ascertained.

From the short description above, it will be readily appreciated by a person of ordinary skill in the art to which the invention pertains—and even most casual readers—that the two spatial coordinate systems used by the first and second spatial-positioning subsystems must agree within certain allowable tolerances. This is true regardless of whether the disparate spatial-positioning systems employ the same or disparate locating methodologies (i.e., "inside-out" or "outside-in"). Accordingly, each spatial-positioning system is initially calibrated with reference to a known initial marker or initial tracker associated with that particular spatial-positioning system, and having a known location and orientation within the physical space. The mutual spacing of the initial markers and/or initial trackers is predetermined and provided as a "known" to the data-processing system so that the co-alignment program can algorithmically bring them into mutual alignment. These initial markers and/or trackers may be collectively part of a "calibration cluster," an example of which is further described in the detailed description. Individually, each of these initial markers/trackers may be referred to as a "calibration marker" or "calibration tracker." The term "anchor" is also sometimes used since the general idea is to establish an initial coordinate system (e.g., a Cartesian grid with x, y, and z axes) against which subsequent motion is detected and tracked relative to this fixed reference point.

Beyond the calibration or "anchoring" markers and/or trackers, implementations of the system employ trackers and/or markers which may be individually referred to as "an object tag" and referred to in the plural as "object tags." Object tags are spatially associated with various objects of interest relative to an operator-implemented procedure. For instance, tools required for procedure steps may be "tagged" with object tags (markers or trackers) so that their locations and orientations can be tracked by the spatial-positioning subsystem associated therewith; for example, the second spatial-positioning subsystem described in association with one previous example. The headset may also be similarly tagged for the spatial-positioning subsystem associated therewith, such as the first-spatial positioning subsystem described above.

In some implementations, tags may not be required for object identification and tracking of location and orientation. More specifically, a spatial-positioning subsystem associated some implementations may employ object identification, and location and orientation detection, through a process known as "edge detection." That is, one or more base stations associated with a spatial-positioning system emits signals—usually electromagnetic radiation—into the physical space and identifies objects such as workpiece objects and tools by their physical shapes. These shapes (boundaries or "edges") are ascertained by the reflection of energy (e.g., electromagnetic energy) back to one or more base stations associated with the spatial-positioning system. Alternatively or additionally, tool workpiece object identification can be facilitated with camera imagery acquired by one or more cameras carried by the headset or otherwise located to acquire images of objects within the physical space.

In accordance with an illustrative implementation, the first spatial-positing subsystem is caused to detect, and generate a machine-readable first data set indicative of, the presence, location, and orientation within the physical space of a system user wearing the headset. Similarly, the second spatial-positioning system is caused to detect, and generate a machine-readable second data set indicative of, the presence, location, and orientation within the physical space of at least one of (i) a workpiece object on which at least the first procedure step is to be performed and (ii) at least one tool with which that same step is to be performed. The first and second data sets are rendered accessible (e.g., communicated) to the co-alignment program and "co-aligned."

Implementations of the invention require coordination among (i) the procedure program; (ii) the at least one spatial-positioning subsystem associated with any particular implementation; and (iii) the co-alignment program in implementations in which it is needed to co-align first and second spatial-positioning subsystems. In this way, the procedure program tracks steps in the operator-implemented procedure, including a first step, a present step, and subsequent steps, as applicable. The procedure program also includes data as to which tools are required for particular steps and on what workpiece objects operations are to be performed in accordance with particular steps. Coordination among these various aspects facilitates presentation to the system user wearing the headset, in accordance with the machine-executable procedure program, a visual output on the display associated with a procedure step and indicative of at least one of (i) an operation to be to be performed in accordance with that procedure step, (ii) the location of the workpiece object on which the operation is to be performed, and (iii) the location of the tool to be used in performing the operation.

As previously discussed, variations of the method employ smart tools communicatively linked to, and capable of exchanging information and commands with, the data-processing system. In conjunction with the spatial guidance and procedure control system, a method for assisting a human system operator in the execution of an operator-implemented procedure including at least a first procedure step, and using at least one smart tool, is now described. A provided smart tool with which at least a first procedure step is to be performed relative to a workpiece object, and in accordance with a machine-executable procedure program, is communicatively linked to the data-processing system. Also provided is a spatial-positioning subsystem configured to generate, and communicate to the data-processing system, machine-readable data indicative of at least one of the location and orientation within the physical space of at least one of (i) the workpiece object on which the first procedure step is to be performed and (ii) the smart tool with which that procedure step is to be performed. Alternative versions employing smart tools include or exclude a headset.

In one version employing a smart tool, there is established a predefined proximity between the workpiece object and the smart tool relative to which the smart tool is selectively activatable and deactivatable. The locations of the workpiece object and the smart tool are detected by the spatial-positioning subsystem which generates, and communicates to the data-processing system, data indicative of the locations of the workpiece and the smart tool. From this location data, the data-processing system can determine—on a continuous basis or in predetermined temporal increments—the relative real-time proximity of the workpiece object and the smart tool. With the real-time proximity of the workpiece object and the smart tool determined, the real-time is proximity is algorithmically compared to the predefined proximity.

Based on the algorithmic comparison, a determination is rendered as to whether the real-time proximity is one of (a) within and (b) outside of (or "without") the predetermined proximity. According to one version, in response to a determination that the real-time proximity is within the predefined proximity, the data-processing system is caused to communicate to the smart tool a command to activate. Correlatively, in another version, in response to a determination that the real-time proximity is outside of the predefined proximity, the data-processing system is caused to communicate to the smart tool a command to deactivate. It is envisioned that a version including one of automated proximity-dependent activation and deactivation as described above will include both; however, this need not be the case. In an implementation including one of automated proximity-dependent activation and deactivation, but not both, the function—activation or deactivation—that is not automated can be performed manually by the system operator.

As previously discussed, a smart tool may exchange information with the data-processing system relative to procedure steps. This information exchange may involve more than commands to activate or deactivate. The data-processing system may issue commands that the activated tool function in a certain way as determined by the procedure program. Alternatively, or additionally, the smart tool may communicate to the data-processing system data confirming performance of predetermined functions in real time. Such other exchanges of information with the data-processing system may be included in a particular implementation including or not including the capability of the data-processing system to automatically activate or deactivate the smart tool. Myriad commands to, and reports from, a smart tool are possible, and can illustratively include commands to operate within certain parameters such as (i) applied torque; (ii) spin rate (of a drill, saw, or grinder, for example); (iii) temperature of a torch; (iv) applied current or voltage; (v) air pressure relative to a pneumatic tool; (vi) applied suction; (vii) applied magnetic field strength; (viii) ejection of fluids, such as water for water-jet cutters or air from blowers; (ix) applied hydraulic pressure and/or force relative to apparatus such as jacks, clamps, or presses; (x) light intensity; (xi) flowrates and volume control of fluids, including the application of uncured liquid adhesives; and (xii) addition of pigments in process involving dyeing, all by way of non-limiting illustrative example.

Representative embodiments and implementations are more completely described and depicted in the following detailed description and the accompanying drawings.

DETAILED DESCRIPTION

The following description of variously implemented spatial guidance and procedure control systems and methods is demonstrative in nature, and is not intended to limit the invention or its application of uses. Accordingly, the various implementations, aspects, versions and embodiments described in the summary and detailed description are in the nature of non-limiting examples falling within the scope of the appended claims and do not serve to constrict the maximum scope of the claims.

Figure 1:
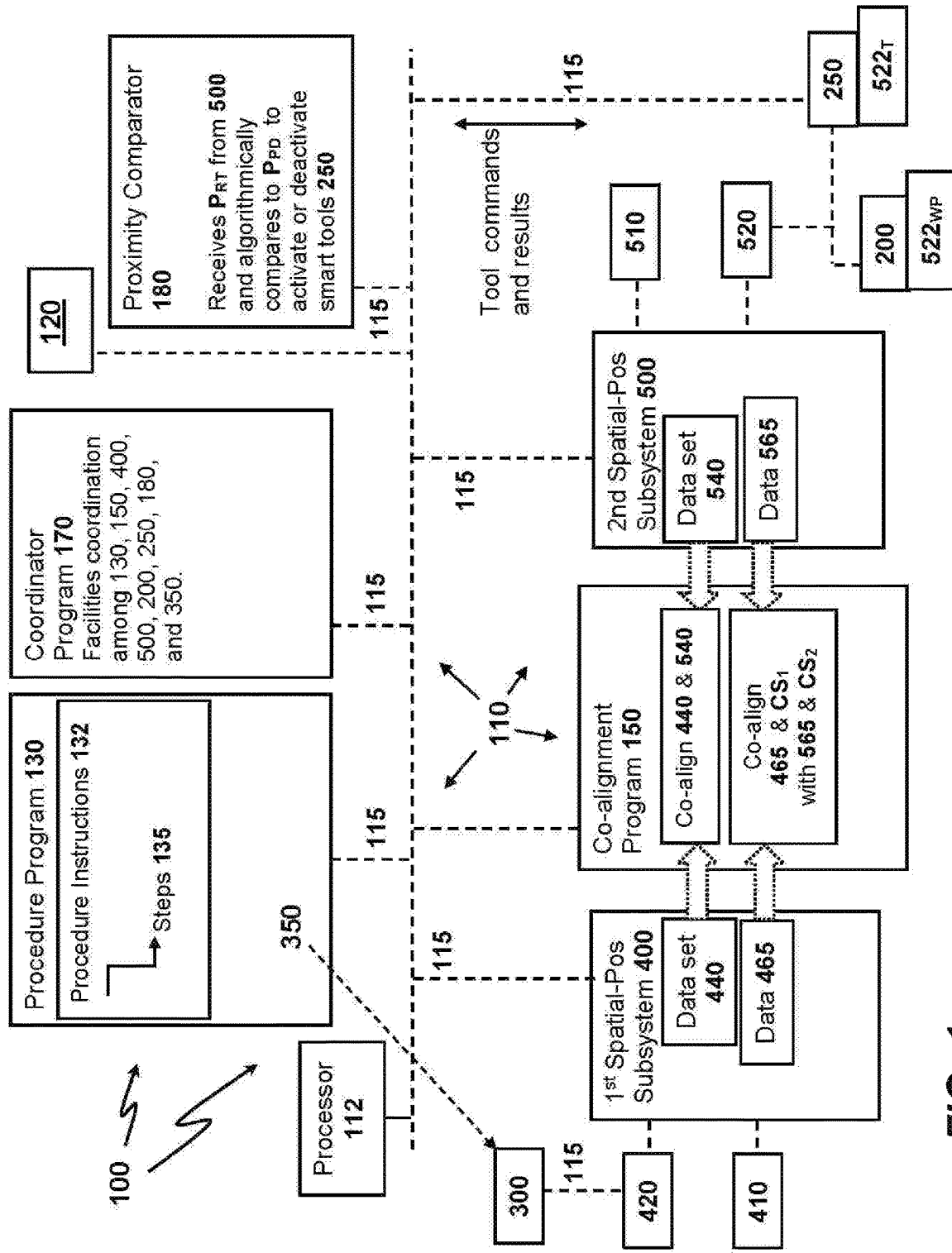
FIG. 1 schematically depicts an illustrative communications and data-processing architecture for the implementation of a spatial guidance and procedure control system for assisting a human system operator in the execution of a predetermined user-implemented procedure.
Figure 2:
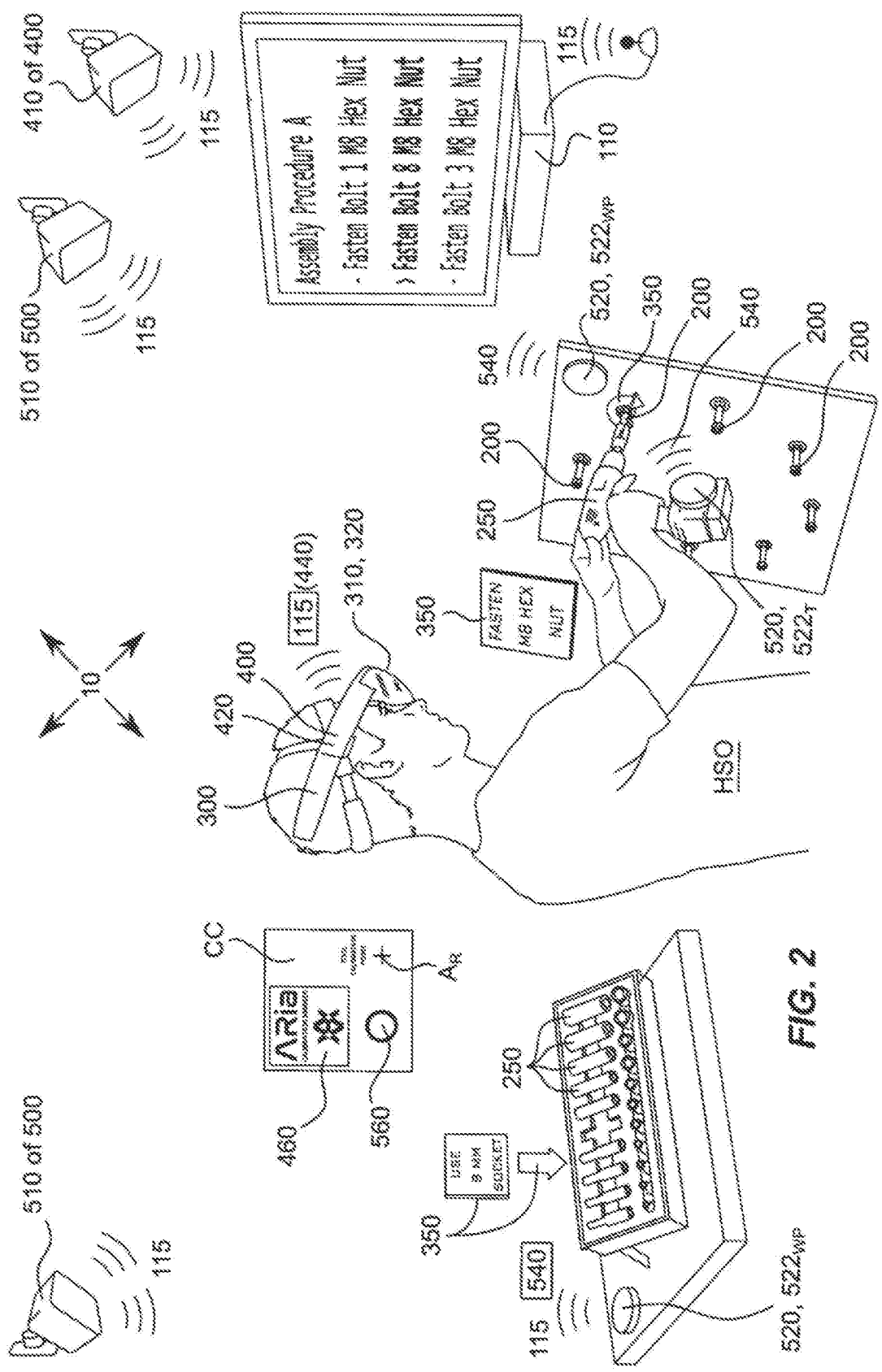
FIG. 2 depicts an illustrative physical space or "work cell" in which a human system operator performing a guided procedure is working

With initial reference to the function-block schematic of FIG. 1 and the work space diagram of FIG. 2, there is shown and described an illustrative implementation and associated architecture of a spatial guidance and procedure control system 100 for assisting a human system operator HSO in the execution, within a predefined physical space 10, of a predetermined user-implemented procedure including at least a first procedure step. For brevity, the spatial guidance and procedure control system 100 may be variously abridged to "system 100," "guidance and control system 100," or some similar abbreviated designation associated with reference number 100. The guidance and control system 100 includes access to a data-processing system 110. The data-processing system 110 includes a central processing unit (CPU, or, simply, "processor") 112 that is communicatively linked to a computer memory 120.

Although the data-processing system 110 is schematically depicted in a manner potentially giving rise to an assumption that all processing, data storage, and program execution is performed in a single location by a single machine, it is to be understood that this need not be the case. In fact, in most implementations, the data-processing system 110 will be "distributed" with disparate operations being executed in disparate locations by disparate devices that are communicatively linked to one another. Accordingly, for example, there may be implemented more than one processor 112 and/or computer memory 120 in disparate locations. Various algorithms and machine-executable programs may also be disparately located or "distributed."

As shown in the architecture schematic of FIG. 1 in combination with FIG. 2, the data-processing system 110 is provided with a machine-executable procedure program 130. The procedure program 130 includes procedure instructions 132 indicative of at least the first procedure step 135, but more typically indicative of a plurality of sequential procedure steps 135 including the first and subsequent procedure steps 135. Although not so limited in utility and scope, the user-implemented procedure illustratively includes manipulation of, and operation on, workpiece objects 200, by the system operator HSO, within the physical space 10. Moreover, the operations are illustratively performed with tangible tools 250.

Worth acknowledging is that there is a technical but observable difference between the steps the system operator performs in real space pursuant to the user-implemented procedure and the procedure instructions 132 as contained within the machine-executable procedure program 130. However, there is a general correlation between the two. Accordingly, while these two aspects (i.e., tasks performed in real space by the system operator HSO and procedure instructions 132 or steps 135 of the procedure program 130) may not be used interchangeably per se, they interrelate so closely that the same reference numbers may be used to refer to corresponding aspects in this regard later in the detailed description.

Variously implemented, the system 100 includes a headset 300 configured for wearing by the system operator HSO; at least a first spatial-positioning subsystem 400; and, in some implementations, a second spatial-positioning subsystem 500, each of which is communicatively linked to the data-processing system 110. In all cases throughout the present specification and claims, unless otherwise expressly limited, "communicatively linked," and related variants thereof, includes the ability to transmit and/or receive data by hardwired and/or wireless communication link(s) 115. Throughout the drawings, communications links 115 may be alternatively represented by dashed lines, such as in the architecture schematic of FIG. 1, or as a short series of concentric, radially spaced arcs centered upon and emanating from a source (a ubiquitous representation indicative of wireless transmission and reception that is unmistakable), such as in FIG. 2.

In an exemplary embodiment, the headset 300 is a mixed-reality headset 300 that allows the system operator HSO to view simultaneously both (i) the physical space 10 in which the system operator HSO is situated and (ii) selected machine-generated indicia 350 associated with various procedure steps 135 as prescribed by the procedure program 130. Illustratively, in FIG. 2, the headset 300 includes a translucent visor 310 (e.g. unitary "lens" or pair of lenses) through which the system operator HSO can view physical space 10. Carried by the headset 300 is a headset display 320 through which there can be selectively presented within the field of view of the system user HSO selected machine-generated indicia 350 associated with at least the first procedure step 135.

In a mixed-reality context, the visor 310 serves as the—or at least one—display 320 through which machine-generated indicia 350 are presented to the system operator HSO. Examples of machine-generated indicia 350 are later described in greater detail with conjunctive reference to drawings including same. Information and indicia 350 may also be displayed on other displays such as monitors visible from within the physical space. An example not referenced by a reference number is shown in FIG. 2 just above the box labeled 110 (data-processing system). Moreover, it is to be understood that, while FIG. 2 includes labeled indicia 350, these indicia 350 would be visible to the system operator HSO and not, for example, to someone not wearing a headset 300 communicatively linked to the system 100. Nevertheless, their inclusion in FIG. 2, which is taken from the perspective an outside observer, informs the overall explanation of the invention.

The first spatial-positioning subsystem 400 may include at least one first-subsystem base station 410 and at least one first-subsystem pose tracker 420 that is carried by the headset 300 and configured to communicate with the at least one first-subsystem base station 410. The first spatial-positioning subsystem 400 is configured to detect, and generate a machine-readable first data set 440 indicative of, at least one of the presence, location, and orientation of the headset 300 within the physical space 10 and, by extension, the presence, location, and orientation of the system operator HSO wearing the headset 300. For purposes of lexicography within the present description, "pose tracker" includes within its definition the various on-board sensing devices illustratively presented in the summary in association with virtual-reality and mixed-reality headsets, but does not exclude other means such as "tagging" as that term is generally used in the present specification, and more generally in the vernacular of the relevant arts.

Variations of the system 100 also include apparatus configured to detect, and generate a machine-readable second data set 540 indicative of, at least one of the presence, location, and orientation within the physical space 10 of at least one workpiece object 200 on which a procedure step 135 is to be performed, and at least one tool 250 with which that same procedure step 135 is to be performed. In some versions, the tracking of workpiece objects 200 and tools 250 is accomplished in conjunction with a second spatial-positioning subsystem 500 which generates the second data set 540. However, in alternative versions, the tracking (i.e., detecting and generating data indicative of presence, location, and orientation) of the headset 300, workpiece objects 200, and tools 250 is combined into, and performed by, the single, first spatial-positioning subsystem 400, which first spatial-positioning system 400 generates both the first and second data sets 440 and 540.

While all of the necessary spatial-positioning functions may in some implementations be performed by a single spatial-positioning system (e.g., first spatial-positioning subsystem 400), the detailed description proceeds principally on the assumption that at least first and second spatial-positioning subsystems 400 and 500 are employed. Accordingly, the second spatial-positioning subsystem 500 illustratively includes at least one second-subsystem base station 510, intended to remain stationary, and at least one second-subsystem pose tracker 520 that is spatially associated—in physical space—with each of at least one workpiece object 200 and at least one tool 250 configured to operate on the at least one workpiece object 200. The pose trackers 520 spatially associated with at least one workpiece object 200 and at least one tool 250—and, for that matter, the headset 300—may take the form of object tags, which are described more completely later in the present description.

Relative to an implementation employing at least first and second spatial-positioning subsystems 400 and 500, the data-processing system 110 is provided with access to a machine-executable co-alignment program 150. The co-alignment program 150 is configured to algorithmically coordinate—or "spatially co-align"—the machine-readable first and second data sets 440 and 540 illustratively generated by the first and second spatial-positioning subsystems 400 and 500. In this way, relative to selected points in physical space, the machine-readable first and second data sets 440 and 540 indicative of location and orientation generated by the disparate first and second spatial-positioning subsystems 400 and 500 are caused to be brought into mutual agreement (co-aligned).

As explained in the summary section of the present specification, co-aligning first and second spatial coordinate systems associated with, respectively, first and second spatial-positioning systems 400 and 500 may require initial "anchoring" of each system to be co-aligned. Since the general concept of anchoring a spatial-positioning system relative to a fixed marker that, in essence, serves as the "origin" of the coordinate system associated with that spatial-positioning system is generally known, an illustrative procedure for doing so is only briefly described with conjunctive reference to FIG. 3, and only insofar as necessary to convey an understanding of the co-alignment procedure.

Figure 3:
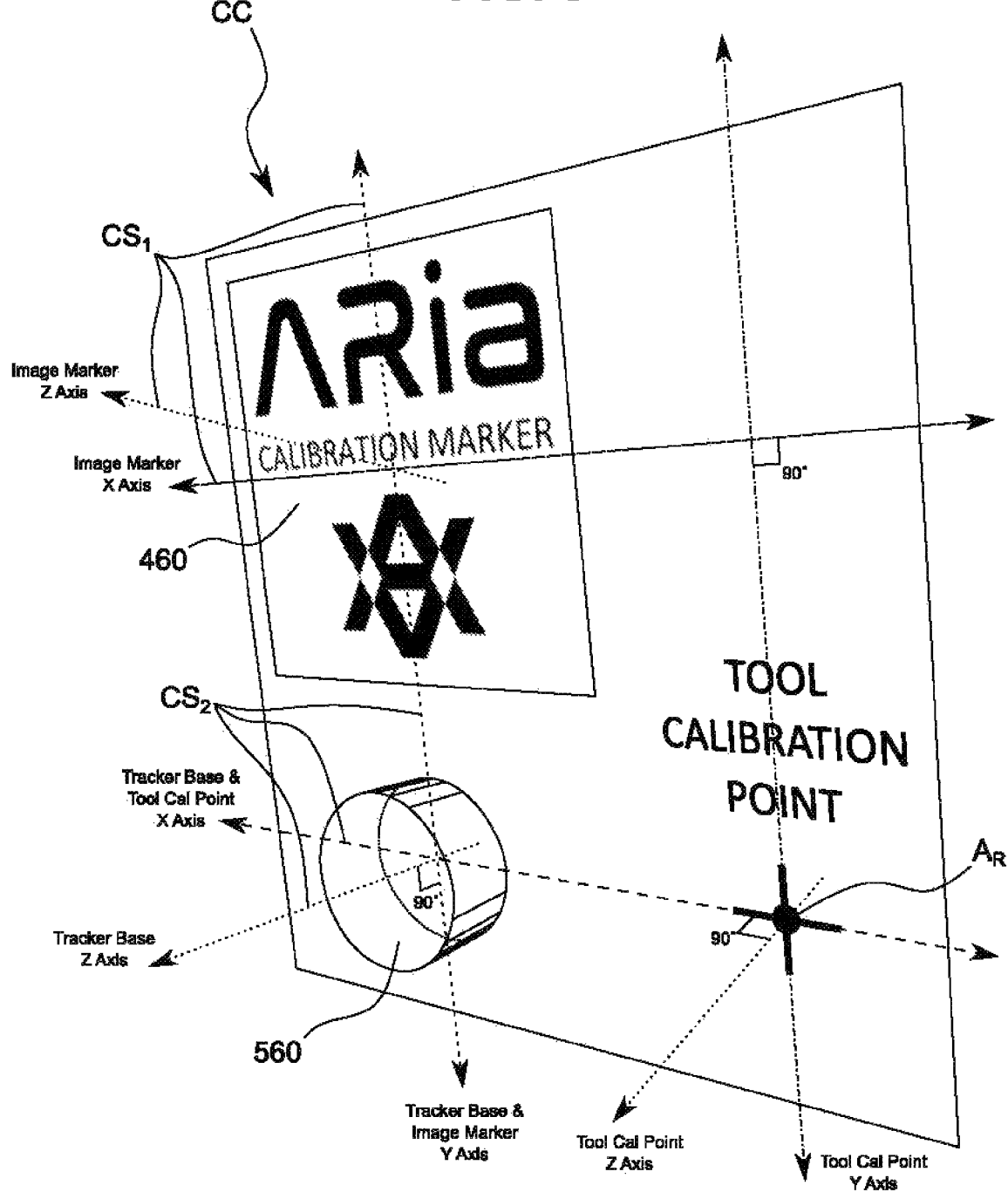
FIG. 3 is an enlarged view in perspective of an illustrative calibration cluster used for establishing the spatial origin of one or more coordinate systems.

Shown in FIG. 3 is an enlarged view in perspective of the illustrative calibration cluster CC initially shown in FIG. 2 within the larger work environment, or work cell. The calibration cluster CC includes three markers or reference anchors 460, 560, and $A_R$. First and second reference anchors 460 and 560 are associated with, respectively, the first and second spatial-positioning systems 400 and 500 indicated in FIGS. 1 and 2. A third reference anchor $A_R$ is provided for orienting the working end (e.g., a bit or socket—"tool point") of a power tool 250, for example, and may also be associated with the second spatial-positioning system 500. However, for purposes of explaining the process of co-alignment, it is necessary only to consider the first and second reference anchors 460 and 560.

According to one illustrative procedure for anchoring the first spatial-positioning system 400 about the first reference anchor 460, a system operator HSO wearing the headset 300 faces the first reference anchor 460. This is action is not shown in FIG. 3, but an examination of FIG. 2 shows an illustrative calibration cluster CC on a wall within the physical space 10, and from this, one can readily infer how this would be carried out by a system operator HSO. The system operator HSO may be required to align a visual indicium (e.g. a target, not shown) appearing on the headset display 320 with the first reference anchor 460, which is a visual tag or marker. In any event, the first spatial-positioning subsystem 400 is permitted to establish as its origin the first reference anchor 460, and to communicate to the data-processing system 110 first-origin data 465 indicative of same. Correlatively, the second spatial-positioning system 500 is activated and permitted to establish as its origin the second reference anchor 560, and to communicate to the data-processing system 110 second-origin data 565 indicative of same. With the origins established, first and second spatial coordinate systems $CS_1$ and $CS_2$ are algorithmically extrapolated therefrom and associated in computer memory 120 with, respectively, the first-origin data 465 and the second-origin data 565 and, respectively, the first and second spatial-positioning systems 400 and 500.

In order to facilitate algorithmic co-alignment of the first and second spatial coordinate systems $CS_1$ and $CS_2$ associated with, respectively, the first and second spatial-positioning systems 400 and 500, the spatial displacement between the first and second reference anchors 460 and 560 is provided as a "known" to the co-alignment program 150. From this, of course, the spatial displacement between the origins of the first and second spatial coordinate systems $CS_1$ and $CS_2$ can be ascertained.

While the above-described spatial displacement could be defined by three vectors of non-zero magnitude associated with x, y, and z axes, for simplicity, the first and second reference anchors 460 and 560 are taken to reside along the same plane such that their relative displacement can be expressed in terms of a single coordinate-axis vector of non-zero value. With specific reference to the illustrative calibration cluster of FIG. 3, over which first and second spatial coordinate systems $CS_1$ and $CS_2$ have been superimposed, the x-y plane is defined as the plane of the panel surface on which the reference anchors 460 and 560 are situated. The x-axis runs left to right, and the y-axis extends vertically relative to the drawing sheet. The z-axis, therefore, extends into and through the plane of the panel and orthogonally to each of the x-axis and y-axis. Accordingly, as depicted, the second reference anchor 560 is displaced y units of measure (e.g., centimeters) below the first reference anchor 460. Accordingly, a mathematical matrix can be established in association with the co-alignment program 150 that causes the co-alignment program 150 to add "y units of measure" to the y-axis of the second data set 540 indicative of the locations of objects of interest beyond the second anchor 560 being tracked by the second spatial-positioning system 500. The addition of "y units of measure" corrects for (i.e., algorithmically co-aligns) the first and second spatial-positioning systems 400 and 500. Of course, y units of measure could be subtracted from the first data set 440 to achieve the same alignment result.

Although co-alignment was explained with reference to a Cartesian grid, it is to be understood that the same principles would apply if an alternative coordinate system were employed. For instance, analogous correction factors could be implemented relative to cylindrical polar coordinates or spherical polar coordinates.

Beyond the calibration or "anchoring" markers and/or trackers 460 and 560, for example, there needs to be a way to track the movement within the physical space 10 of workpiece objects 200 and tools 250. Unless there are implemented edge detection techniques as described in the summary, spatially tracking objects of interest such as workpiece objects 200 and tools 250 illustratively involves associated pose trackers 520. As briefly explained earlier in the detailed description, pose trackers 520 may assume the form of, and/or be alternatively referred to as, "object tags." More specifically, and with reference to FIGS. 1, 2, 4A, and 4B, object tags 522 are spatially associated with various objects of interest relative to an operator implemented procedure. For instance, tools 250 required for procedure steps 135 may be "tagged" with object tags 522 so that their locations and orientations can be tracked by the spatial-positioning subsystem (400 and/or 500) associated therewith; for example, the second spatial-positioning subsystem 500 previously described. The headset 300 may also be similarly tagged for the spatial-positioning subsystem associated therewith, such as the first-spatial positioning subsystem 400 described above. While object tags 522 generally may be referenced by the numeric reference character 522, the reference characters specifically referencing object tags 522 associated with workpiece objects 200 may further include the alphabetic characters WP, such that the full alphanumeric reference character pertaining thereto is $522_{WP}$. Correlatively, the reference characters designating object tags 522 associated with tools 250 may further include the alphabetic designator T, such that the full alphanumeric reference character pertaining thereto is $522_T$.

As explained in the summary, implementations of the invention require algorithmic coordination among (i) the procedure program 130; (ii) the at least one spatial-positioning subsystem associated with any particular implementation, which in the present example involves first and second spatial-positioning systems 400 and 500; and (iii) the co-alignment program 150 in implementations such as the one under consideration in which co-alignment of the first and second spatial-positioning subsystems 400 and 500 is needed. In various implementations, algorithmic coordination is performed by a coordinator program 170. In this way, the procedure program 130 tracks procedure steps 135 relating to the operator-implemented procedure through the programmed procedure instructions 132, including programmed procedure steps 135 indicative of, for example, a first step, a present step, and subsequent steps, as applicable. The procedure program 130 also includes data as to which tools 250 are required relative to particular procedure steps 135, and on what workpiece objects 200 operations are to be performed in accordance with particular procedure steps 135. Coordination among these various aspects facilitates presentation on the display 320 to the system operator HSO wearing the headset 300, and in accordance with the machine-executable procedure program 130, a visual output (machine-generated indicia 350) associated with a procedure step 135, and indicative of at least one of (i) an operation to be to be performed in accordance with the procedure step 135, (ii) the location of the workpiece object 200 on which the operation is to be performed, and (iii) the location of the tool 250 to be used in performing the operation.

Figure 4A:
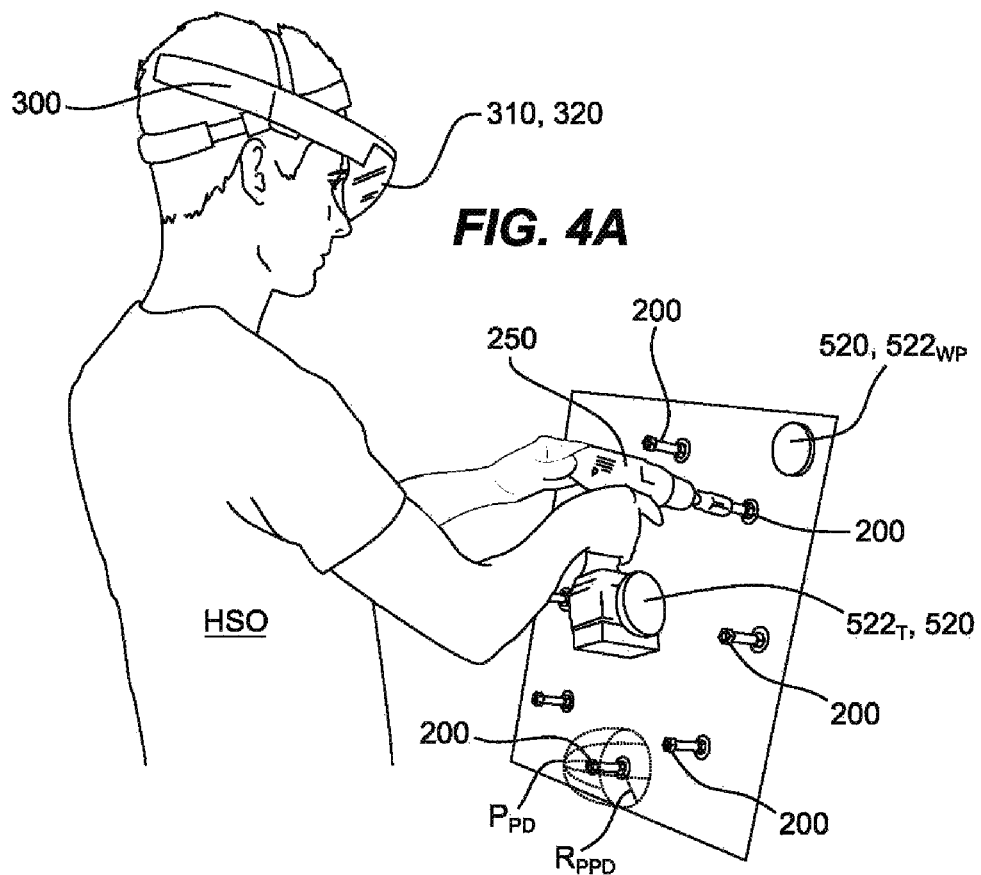
FIG. 4A is an "external" or third-person view of a human system operator executing a step by performing an action on a workpiece object with a tool.
Figure 4B:
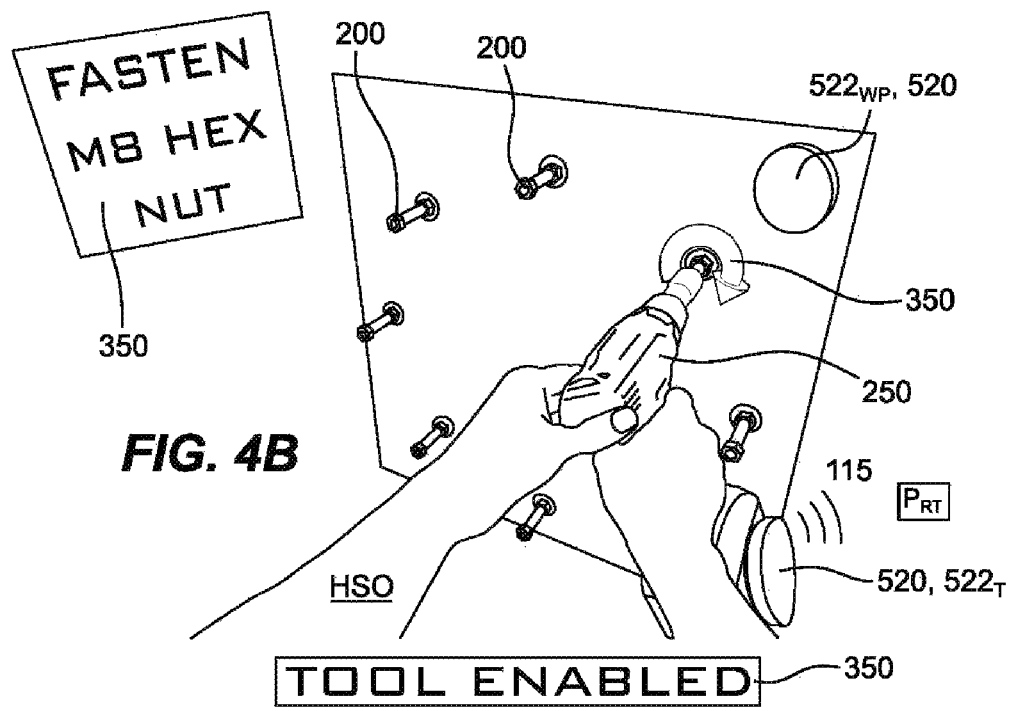
FIG. 4B is an "internal" or first-person view from the perspective of the human system operator of FIG. 4A performing the action on the workpiece object.

Referring to FIGS. 4A and 4B, there are shown two views of a system operator HSO executing a procedure step 135. More specifically, FIG. 4A depicts an "external view," a view that an outside observer viewing the system operator HSO performing his task might see. FIG. 4B is illustrative of the view from the perspective of the system operator HSO performing the same task as in FIG. 4A. That is, FIG. 4B is a representation of the view experienced by the system operator HSO as augmented by the mixed-reality headset 300 worn by the system operator HSO shown in FIG. 4A.

Illustratively, the system operator HSO in FIGS. 4A and 4B is using tool 250 to operate on workpiece objects 200. In this example, tool 250 is a handheld power wrench and the workpiece objects 200 are threaded fasteners in the form of hex nuts. As seen with reference the external view of FIG. 4A, no machine-generated indicia 350 are visible to the outside observer. However, with reference to FIG. 4B, illustrative machine-generated indicia 350 are presented to the system user HSO wearing the headset 300 in accordance with a current procedure step 135 as dictated by the machine-executable procedure program 130. In this instance, two visual indicia 350 are presented to the system operator: (i) a textual message reading "FASTEN M8 HEX NUT" and (ii) a graphic of an arcuate arrow appearing to the system user HSO to partially surround the stem of a bolt onto to which the system user HSO is being instructed to tighten the M8 hex nut.

As previously indicated, the indicia 350 may appear as illuminated graphics and may also indicate motion by actually moving. So, for instance, the arcuate arrow indicium 350 may rotate about the bolt stem from the perspective of the system user HSO. From the concrete example of FIGS. 4A and 4B, it can readily be appreciated that co-alignment of spatial-positioning systems (e.g., 400 and 500), and coordination among various previously-discussed elements of the system 100 is very important in ensuring that indicia 350 are presented at the appropriate times and in the appropriate locations in accordance with the procedure steps 135 of the procedure program 130, particularly when workpiece objects 200 are in close mutual proximity. For instance, if the arcuate arrow indicium of FIG. 4B appeared to the user to be midway between two of the hex nuts to be tightened, that indicium 350 would be of little to no use.

The instructions 132 provided in accordance with the procedure program 130 may vary in "granularity" relative to the overall operator-executed procedure. For example, with reference to FIG. 4B, a less granular procedure step 135 might be associated with a machine-generated indicium 350 that simply advises the system user HSO to "tighten hex nuts 1-8," and then it would be up to the system user HSO to tighten the hex nuts in accordance with his or her own interpretation of that indicium 350. In contrast, a more granular set of instructions 132 might cause to be presented to the system user HSO an indicium 350 indicating action with respect to each hex nut. In the example shown, the textual indicium 350 instructs the system user HSO to "fasten M8 hex nut," and a separate similar indicium 350 may be presented corresponding to a similar procedure instruction 132 for each of the other seven hex nuts because, for example, the order in which the hex nuts are fastened may be important to the overall operator-executed procedure.

While continued reference to FIGS. 4A and 4B, attention is drawn to the workpiece object tag $522_{WP}$ and the tool object tag $522_T$. The workpiece object tag $522_{WP}$ is situated in the vicinity of the workpiece objects 200 (the hex nuts, in this case), and in a location "known" to the system 100 via, in this case, the second spatial-positioning subsystem 500. Readily observable is the fact that each hex nut workpiece object 200 is uniquely spatially situated relative to the workpiece object tag $522_{WP}$. If the spatial relationship of each hex nut workpiece object 200 is "known" by the second-spatial positioning subsystem 500, then actions relative to each hex nut workpiece object 200 can be individually tracked independent of actions with respect to the other hex nut workpiece objects 200. More specially, if the hex nut workpiece objects 200 are known to the system 100 to be M1, M2, M3 . . . thru M8 hex nuts based on the position of each, then the procedure program 130 can instruct the system user HSO relative to each hex nut workpiece object 200 individually. That is, the procedure program 130 can cause to be presented to the system user HSO at least one indicium 350 indicative of action to be executed relative to each workpiece object 200. Moreover, the inclusion of the tool object tag $522_T$ (aka, pose tracker 520) on the tool 250 enables the second spatial-positioning system 500 to track the location and orientation of the tool 250, present to the system operator HSO an indicium 350 that this is the correct tool 250 to use, and indicate to the system user HSO the location of the tool 250.

As discussed in the summary, a tool 250 associated with the system 100 may be a smart tool 250 communicatively linked to, and capable of exchanging information and commands with, the data-processing system 110. In one version employing a smart tool 250, which is explained with principal conjunctive reference to FIG. 4A and FIG. 1, there is established a predefined proximity $P_{PD}$ between a workpiece object 200 and the smart tool 250 relative to which the smart tool 250 is selectively activatable and deactivatable. The locations of the workpiece object 200 and the smart tool 250 are detected by the second spatial-positioning system 500 which generates, and communicates to the data-processing system 110, data indicative of the locations of the workpiece 200 and the smart tool 250. From this location data, a proximity comparator 180 associated with the data-processing system 110 can algorithmically determine—on a continuous basis or in predetermined temporal increments—the relative real-time proximity $P_{RT}$ of the workpiece object 200 and the smart tool 250. With the real-time proximity $P_{RT}$ of the workpiece object 200 and the smart tool 250 determined, the real-time proximity $P_{RT}$ is algorithmically compared to the predefined proximity $P_{PD}$. In FIG. 4A, the predefined proximity $P_{PD}$ is illustratively represented by a phantom hemisphere of radius $R_{PPD}$.

Based on the algorithmic comparison between the real-time proximity $P_{RT}$ and the predefined proximity $P_{PD}$, a determination is rendered as to whether the real-time proximity $P_{RT}$ is one of (a) within and (b) outside of (or "without") the predetermined proximity $P_{PD}$. According to one version, in response to a determination that the real-time proximity $P_{RT}$ is within the predefined proximity $P_{PD}$, the data-processing system 110 is caused to communicate to the smart tool 250 a command to activate. Correlatively, in another version, in response to a determination that the real-time $P_{RT}$ proximity is outside of the predefined proximity $P_{PD}$, the data-processing system 110 is caused to communicate to the smart tool a command to deactivate.

It will be appreciated from the foregoing that, in addition to displayed indicia 350 presented to the system user HSO, proximity-dependent activation and deactivation of a smart tool 250 may also facilitate error reduction/avoidance by the system user HSO. For example, if the predefined proximities $P_{PD}$ relative to multiple workpiece objects 200 are defined tightly enough such that they do not overlap, then the procedure program 130 can dictate that the smart tool 200 is activated only when within the predefined proximity $P_{PD}$ of a particular workpiece object 250 relative to a "present" procedure step 135. That is, if the procedure program 130 calls for a particular workpiece object 250 to be acted upon presently, then the relevant parameters can be established such that the tool 250 cannot be activated in accordance with the present procedure step 135 in is proximity to the incorrect workpiece object 200. In FIG. 4B, an illustrative textual indicium 350 indicates to the system operator HSO "tool enabled," indicating that the tool 250 is activated because it is within the predefined proximity $P_{PD}$ relative to the hex nut workpiece object 200 being acted upon, and that workpiece object 200 is appropriate relative to the present procedure step 135.

As discussed in the summary, a smart tool 250 may be capable of not only receiving various commands from the data-processing system 110, but can send results back to the data-processing system 110 for storage in computer memory 120. An illustrative two-way communication arrangement between the data-processing system 110 and a tool 250 is shown in FIG. 1 as a double-pointed arrow labeled "tool commands and results."

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. An augmented reality spatial guidance and procedure control method for assisting a human system operator in the execution, within a predefined physical space, of a predetermined user-implemented procedure including at least a first procedure step, the method comprising:
   providing a programmable data-processing system including a computer memory;
   providing to the data-processing system a machine-executable procedure program including procedure instructions indicative of at least the first procedure step;
   providing a headset configured for wearing by the system user and including (i) a translucent visor through which the system operator can view the physical space in which the system operator is situated and (ii) a display carried by the headset through which there can be presented within the field of view of the system user selected machine-generated indicia associated with at least the first procedure step;
   providing a first spatial-positioning subsystem configured to generate machine-readable data indicative of at least one of the location and orientation of a system operator wearing the headset within the physical space;
   providing a second spatial-positioning subsystem distinct from the first spatial-positioning subsystem and configured to generate machine-readable data indicative of at least one of the location and orientation within the physical space of at least one of (i) a workpiece object on which a procedure step is to be performed by the system operator and (ii) a tool with which that procedure step is to be performed by the system operator;
   providing to the data-processing system a machine-executable co-alignment program configured to algorithmically coordinate the machine-readable data generated by the first and second spatial-positioning subsystems such that, relative to selected points in the physical space, machine-readable data indicative of location and orientation generated by the first and second spatial-positioning subsystems are in mutual agreement;
   initiating the machine-executable procedure program corresponding to the user-implemented procedure to be performed on a predetermined workpiece object situated within the physical space with a predetermined tool situated within the physical space;
   causing the first spatial-positioning subsystem to detect, and generate a machine-readable first data set indicative of, the presence, location, and orientation within the physical space of a system user wearing the headset, and rendering that first data set accessible to the co-alignment program;
   causing the second spatial-positioning subsystem to detect, and generate a machine-readable second data set indicative of, the presence, location, and orientation within the physical space of at least one workpiece object on which at least the first procedure step is to performed and at least one tool with which that same step is to be performed, and rendering that second data set accessible to the co-alignment program;
   algorithmically co-aligning the first and second data sets; and
   presenting to the system user through the display of the headset, and in accordance with the machine-executable procedure program, an indicium associated with the first procedure step and indicative of at least one of (i) an operation to be to be performed in accordance with the first procedure step, (ii) the location of the workpiece object on which the operation is to be performed, and (iii) the location of the tool to be used in performing the operation.

2. The method of claim 1 wherein the indicium includes an illuminated graphic.

3. The method of claim 2 wherein the illuminated graphic is presented to the system user from the translucent visor and appears to the system user to be superimposed onto the vicinity about each object of a selected set of objects existing in the physical space that the system user sees through the visor.

4. The method of claim 3 wherein among the selected objects about which the illuminated graphic appears to the system user to be superimposed is at least one of (i) a workpiece object on which a procedure step is to be performed by the system operator and (ii) a tool with which that procedure step is to be performed by the system operator.

* * * * *